United States Patent
Brandon et al.

(10) Patent No.: US 11,703,480 B2
(45) Date of Patent: Jul. 18, 2023

(54) TRANSDUCER-BASED STRUCTURAL HEALTH MONITORING OF AUTONOMOUS VEHICLES

(71) Applicant: GM Cruise Holdings LLC, San Francisco, CA (US)

(72) Inventors: Jeffrey Brandon, Phoenix, AZ (US); Amanda Lind, Brooklyn, NY (US)

(73) Assignee: GM Cruise Holdings LLC, San Francisco, CA (US)

( * ) Notice: Subject to any disclaimer, the term of this patent is extended or adjusted under 35 U.S.C. 154(b) by 306 days.

(21) Appl. No.: 17/095,835

(22) Filed: Nov. 12, 2020

(65) Prior Publication Data

US 2022/0146456 A1    May 12, 2022

(51) Int. Cl.
*G01N 29/04* (2006.01)
*G01C 21/34* (2006.01)
*G01L 1/16* (2006.01)
*G01M 17/007* (2006.01)
*G01N 29/24* (2006.01)
*G01P 15/18* (2013.01)
*G10L 25/51* (2013.01)
(Continued)

(52) U.S. Cl.
CPC ....... *G01N 29/045* (2013.01); *G01C 21/3407* (2013.01); *G01L 1/16* (2013.01); *G01M 17/007* (2013.01); *G01N 29/2437* (2013.01); *G01P 15/18* (2013.01); *G10L 25/51* (2013.01); *H04R 1/406* (2013.01); *H04R 3/005* (2013.01); *G01N 2291/0234* (2013.01); *G01N 2291/0289* (2013.01); *H04R 2499/13* (2013.01)

(58) Field of Classification Search
CPC ............. G01N 29/045; G01N 29/2437; G01N 2291/0234; G01N 2291/0289; G01C 21/3407; G01L 1/16; G01M 17/007; G01P 15/18; H04R 1/406; H04R 3/005; H04R 2499/13; G07C 5/0808; G07C 5/008

See application file for complete search history.

(56) References Cited

U.S. PATENT DOCUMENTS

| 6,072,388 A | 6/2000 | Kyrtsos |
| 6,151,539 A | 11/2000 | Bergholz et al. |

(Continued)

FOREIGN PATENT DOCUMENTS

| CN | 103231693 A | * | 8/2013 |
| CN | 103231693 A | | 8/2013 |
| EP | 1743819 B1 | | 9/2009 |

OTHER PUBLICATIONS

Bosch, R., "Pressure Tube Sensor," Bosch Mobility Solutions; 6 pages (2020).

(Continued)

*Primary Examiner* — Gertrude Arthur Jeanglaude
(74) *Attorney, Agent, or Firm* — Akona IP

(57) ABSTRACT

Systems and methods are provided for monitoring the structural integrity of a vehicle. In particular, systems and methods are provided for using transducers positioned at various location in and on a vehicle to measure parameters related vehicle structural health. In various implementations, the integrity of the vehicle frame and the integrity of the vehicle body are monitored using a multi-axis accelerometer and/or microphone. The use of transducers for monitoring can replace time-consuming and expensive manual inspections.

20 Claims, 7 Drawing Sheets

(51) Int. Cl.
*H04R 1/40* (2006.01)
*H04R 3/00* (2006.01)

(56) References Cited

U.S. PATENT DOCUMENTS

| | | |
|---|---|---|
| 7,138,938 B1 | 11/2006 | Prakah-Asante et al. |
| 7,487,059 B2 | 2/2009 | Davis et al. |
| 7,650,210 B2 | 1/2010 | Breed |
| 7,844,378 B2 | 11/2010 | Lange |
| 8,036,788 B2 | 10/2011 | Breed |
| 9,349,225 B2 | 5/2016 | Wanami et al. |
| 10,093,435 B2 | 10/2018 | Silva et al. |
| 2005/0038580 A1* | 2/2005 | Seim ............... G06Q 30/06 701/31.4 |
| 2005/0125117 A1 | 6/2005 | Breed |
| 2013/0021138 A1* | 1/2013 | Ezzat ............... G07C 5/08 340/10.1 |
| 2014/0324275 A1 | 10/2014 | Stanek et al. |
| 2019/0225233 A1 | 7/2019 | Tod et al. |
| 2022/0144258 A1 | 5/2022 | Lind et al. |

OTHER PUBLICATIONS

U.S. Appl. No. 17/735,661 entitled "Touch and Collision Transducer Sensor Simulation Using Matrix Lookup Table and Signal Generation," filed May 3, 2022; 50 pages.

\* cited by examiner

TRANSDUCER-BASED STRUCTURAL HEALTH MONITORING OF AUTONOMOUS VEHICLES

FIELD OF THE DISCLOSURE

The present disclosure relates generally to structural health of vehicles and to systems and methods for using transducers to monitor structural integrity of vehicles.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

Autonomous vehicles are often used in rideshare services and are a part of vehicle fleets that aim to maximize drive time for the vehicles, and aim to have the vehicles function most hour every day for many years. Thus, autonomous vehicles may drive many hundreds of thousands of miles before being retired. The structural integrity of a vehicle can become weakened or otherwise compromised due to the vehicle's extended road time.

SUMMARY

Systems and methods are provided for using monitoring the structural integrity of a vehicle. In particular, systems and methods are provided for using transducers positioned at various location in and on a vehicle to measure parameters related vehicle structural health. In various implementations, the integrity of the vehicle frame and the integrity of the vehicle body are monitored using a multi-axis accelerometer and/or microphone. Measurements from the multi-axis accelerometer and/or microphone are used to identify damage to the vehicle frame and/or vehicle body. In some examples, the vehicle damage is caused by fatigue. In various implementations, the transducers are installed on the vehicle and the transducer signals are continuously monitored throughout the life of the vehicle to detect structural issues as the issues arise. The use of transducers for monitoring can replace time-consuming and expensive manual inspections.

According to one aspect, a system for monitoring structural integrity of a vehicle includes a plurality of transducers positioned in the vehicle configured to generate transducer data; a data acquisition module configured to receive the transducer data and generating combined transducer data; and a processor configured to process the combined transducer data and identify outlier data. In some implementations, the outlier data indicates a change in the structural integrity of the vehicle.

According to another aspect, a method for monitoring structural integrity of a vehicle includes receiving transducer data from a plurality of transducers on a vehicle frame; filtering the transducer data to reduce noise; evaluating the transducer data to identify data patterns; and determining a level of structural integrity of the vehicle based on the transducer data. In some implementations, the method includes detecting an outlier in the data patterns. In some implementations, the method includes routing the vehicle to a service center for inspection.

According to another aspect, a system for monitoring structural integrity of a fleet of vehicles includes an onboard computing system on a first autonomous vehicle of the fleet configured to: receive the transducer data from a plurality of transducers on the first autonomous vehicle; and determine a level of structural integrity of the vehicle based on the transducer data; and a central computing system including a routing coordinator configured to: receive first autonomous vehicle data including the level of structural integrity.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Systems and methods are provided for monitoring the structural integrity of a vehicle. In particular, systems and methods are provided for using transducers positioned at various locations in and on a vehicle to measure parameters related vehicle structural health. In various implementations, the integrity of the vehicle frame and the integrity of the vehicle body are monitored using a multi-axis accelerometer, piezo- or ferro-electret based transducer, and/or microphone. Data from various transducers can be compared with high-precision IMU data. Measurements from the multi-axis accelerometer, other transducer, and/or microphone are used to identify damage to the vehicle frame and/or vehicle body. In some examples, the vehicle damage is caused by impact or fatigue. In various implementations, the transducers are installed on the vehicle and the transducer signals are continuously monitored throughout the life of the vehicle to detect structural issues when the issues arise. The model and method for detecting and classifying structural issues improves over time, as examples of various issues are monitored and the recorded data is labeled. In particular, data from many vehicles can be logged and recorded over a long period of time to establish patterns. Established patterns can be classified in various categories, including categories for normal aging, structural failures, and mechanical failures. The patterns can be used to detect early indicators of various failures. The use of transducers for monitoring can replace time-consuming and expensive manual inspections, and help increase fleet longevity.

Autonomous vehicle fleets for rideshare services are generally designed to maximize vehicle use as well as vehicle life. Maximizing driving time while also keeping the vehicle in operation for many years means that vehicles may be operating much longer, and with much higher mileage, than traditional vehicles. In some examples, autonomous vehicles will continue to operate even after driving hundreds of thousands of miles. In order to ensure a consistently safe experience for passengers independent of vehicle age, structural health of vehicles is regularly monitored. In some examples, structural health of vehicles is manually monitored at regular intervals beginning at a select mileage. Manual inspection of a vehicle takes several days per vehicle, given the number of locations to be monitored and the difficulty of accessing the base structure of a vehicle. Systems and methods are provided herein for automating structural health monitoring. In particular, onboard sensor signals are used to detect compromised structural integrity.

Example Autonomous Vehicle Configured for Structural Health Monitoring

Figure 1:
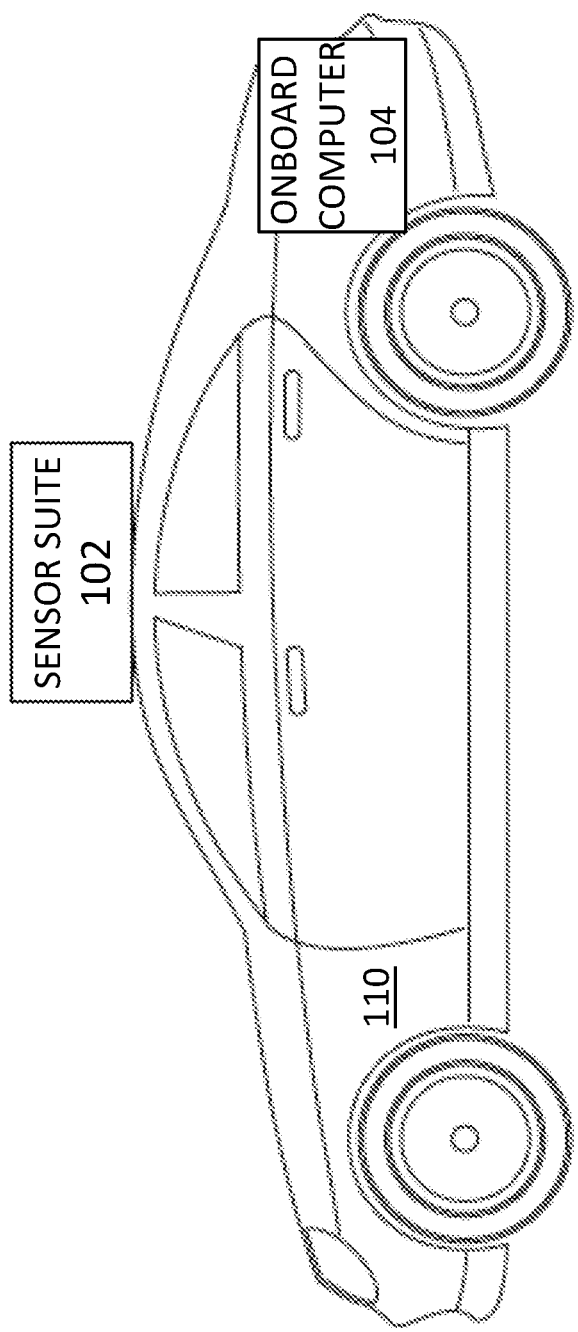
FIG. 1 is a diagram illustrating an autonomous vehicle, according to some embodiments of the disclosure.

FIG. 1 is a diagram 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, and to sense and avoid obstacles. According to various implementations, the autonomous vehicle 110 is part of a fleet of vehicles for picking up passengers and/or packages and driving to selected destinations.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment and, in some examples, sensor suite 102 data is used to detect selected events, and update a high fidelity map. In particular, data from the sensor suite can be used to update a map with information used to develop layers with waypoints identifying selected events, the locations of the encountered events, and the frequency with which the events are encountered at the identified location. In some examples, the events includes road hazard data such as locations of pot holes or debris. In this way, sensor suite 102 data from many autonomous vehicles can continually provide feedback to the mapping system and the high fidelity map can be updated as more and more information is gathered.

The sensor suite 102 includes a plurality of sensors and is coupled to the onboard computer 104. In some examples, the onboard computer 104 receives data captured by the sensor suite 102 and utilizes the data received from the sensors suite 102 in controlling operation of the autonomous vehicle 110. In some examples, one or more sensors in the sensor suite 102 are coupled to the vehicle batteries, and capture information regarding a state of charge of the batteries and/or a state of health of the batteries.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view. In some examples, the sensor suite 102 records information relevant to vehicle structural health. In various examples, additional sensors are positioned within the vehicle, and on other surfaces on the vehicle. In some examples, additional sensors are positioned on the vehicle chassis.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. Based upon the vehicle state and programmed instructions, the onboard computer 104 controls and/or modifies driving behavior of the autonomous vehicle 110.

In some implementations, the onboard computer 104 receives indications of the state of charge and/or state of health of the batteries and determines operations to be performed by the autonomous vehicle 110 based on the state of the batteries. For example, the onboard computer 110 may determine the level of charge of the batteries, and the onboard computer 110 may determine that the batteries need to be charged. In some implementations, based on a determined state of charge and/or state of health of the batteries, the onboard computer may perform operations to address a condition of the batteries, such as causing the vehicle to proceed to a charging station for charging the batteries and causing charging of the batteries to be stopped in response to determining the batteries have been charged to a selected level of charge.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface) and/or other interested parties (e.g., via a vehicle coordinator or a remote expert interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example Vehicle Chassis with Transducers

Figure 2:
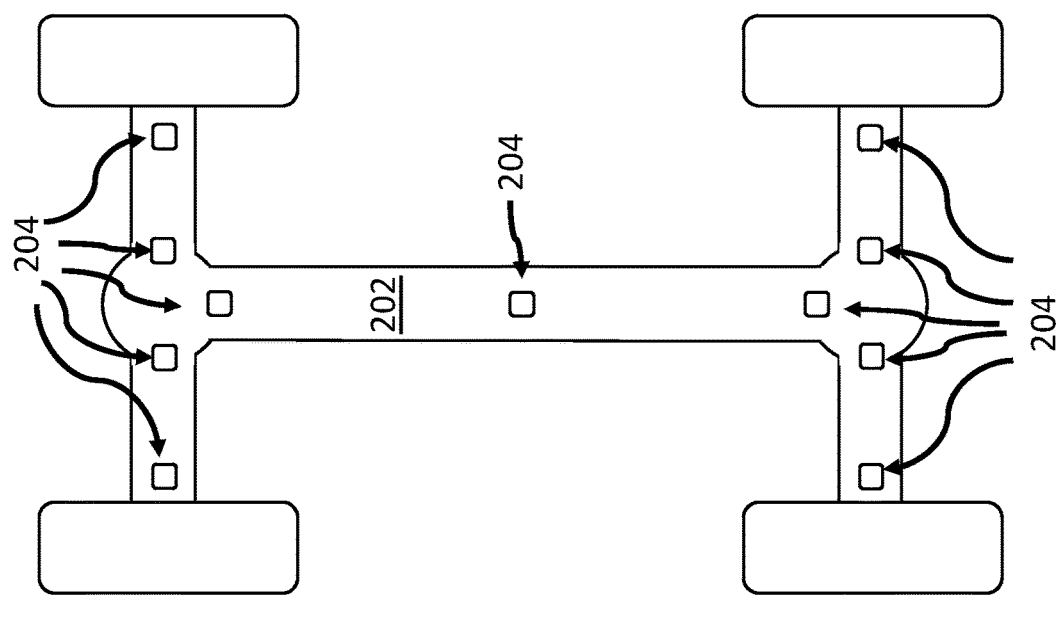
FIG. 2 is a diagram illustrating an example of an autonomous vehicle chassis having multiple transducers, according to various embodiments of the disclosure.

FIG. 2 is a diagram 200 illustrating an example of an autonomous vehicle chassis 202 with multiple transducers 204, according to various embodiments of the invention. The diagram shows a chassis with eleven transducers 204, but in various implementations, any number of transducers can be coupled to the chassis 202. Signals from the transducers 204 are used to monitor structural health of the chassis 202 as well as to monitor the structural health of other portions of the autonomous vehicle the chassis is in.

According to various implementations, one or more of the transducers 204 are piezoelectric transducers. Piezoelectric transducers convert physical quantities into an electrical signal. In some examples, the piezoelectric transducers are deformation-based transducers. The deformation of the transducer is proportional to acceleration and/or strain. In some examples, the piezoelectric transducers are used to measure changes in one or more of pressure, acceleration, force, strain, and temperature via the piezoelectric effect. Piezoelectric transducers can be designed to measure changes along any axis and in some examples, the piezoelectric transducers are 3-axis transducers. In other examples, the piezoelectric transducers are 6-axis transducers. In various examples, the piezoelectric transducers can measure changes along any number of axes. Various modes of operation of the piezoelectric transducers include transverse, longitudinal, and shear. In some implementations, the piezoelectric transducers include a voltage source which changes in proportion to an applied force, pressure, or strain. In some examples, the piezoelectric transducers produce an electric voltage that can be measured to calculate the value of stress or strain applied to a material.

In some implementations, one or more of the transducers 204 are accelerometers. The accelerometers are very sensitive, and can provide structural integrity information, for example by comparing sensed data from multiple transducers, comparing sensed data to a database of collected data, and/or comparing sensed data to a database of features derived from collected data. In some implementations, one or more of the transducers 204 are microphones. In some examples, one or more of the transducers 204 are piezoelectret transducers. The piezoelectret transducers may be deformation-based transducers, and they may be constructed, in part, of foam. In various implementations, one or more of the transducers 204 are permanently integrated into/onto the structure of the vehicle. In some examples, one or more transducers 204 are added temporarily and/or at a later date.

According to various implementations, the transducers 204 generate information such as vibration profiles and impulse responses. In some examples, if the system is excited by tones, sweeps, and/or structured noise, changes in internal reflection can be detected. In some examples, tomography can be used to generate expected structural profiles and detect deviations from expected responses.

One or more of the transducers 204 are positioned near structural element joints. In some examples, the transducers 204 are positioned where the axels are connected to the center bar, and where crash bars connect to the vehicle frame. In various examples, accelerometers are positioned at various high-stress points. The locations of high stress points can be determined using finite element analysis. In various examples, sensors including accelerometers are positioned in multiple locations on the interior fascia of a vehicle. Accelerometer data from various locations can be compared to generate information regarding structural fatigue.

In some examples, one or more transducers are positioned at or close to an interconnect between the vehicle frame and the vehicle fascia. The transducers can capture data indicating whether the frame is loosening. Additionally, the transducers can capture data indicating whether connections between the frame and the fascia are loosening.

In some examples, the vibration response of the vehicle when traversing a specific road feature, such as a speedbump, can be compared to prior encounters with the same (or an equivalent) road feature, since the vehicle may be operated in reproducible ways. Differences in the vibration response over time can indicate structural fatigue.

In some implementations, one or more of the transducers emits one or more frequency waves to excite the structure. For example, one or more of the transducers can emit an ultrasonic frequency. The response of the structure to the ultrasonic frequencies is measured at the transducers 204, and can provide information about structural integrity of various vehicle structures. In some examples, a shaker is applied at one or more locations on the vehicle, and the response to shaker emissions is measured at one or more of the transducers 204. In particular, a shaker emits a high amplitude sound. In some examples, a shaker is applied manually at a service center. The transducers 204 detect the response of the structure to the sound by measuring, for example, reflections of the sound at various locations. Detection of new reflections can indicate a structural defect. If there is a discontinuity in the material of the structure, or a crack in the metal, a new reflection is recorded from that location, and the structural integrity system flags the detected structural defect for inspection. In some examples, a decrease in stiffness of a material, and/or a new nonlinearity between the input excitation and vibration of the structure can also indicate defects.

In some examples, data from various transducers is combined to determine the source of a vibration. In particular, environmental factors such as wind noise and/or a speed bump can affect vibration at the transducers 204, and this can be differentiated from chassis motion causing vibrations at the sensors 204. Coherence can be used to differentiate chassis driven motion from motion due to external inputs like collisions, wind, and/or rain. Additionally, coherence can be used to identify nonlinearities. In $$\text{Coherence}(f) = \frac{|G_{xy}(f)|}{G_{xx}(f)G_{yy}(f)}$$

where $G_{xx}$ is the power spectra of sensor x, $G_{yy}$ is the power spectra of sensor y, and $G_{xy}$ is the cross spectrum. Sensor x is a chassis mount transducer and/or transducer close to the center of mass or suspension; sensor y is a transducer further from the center of mass or suspension than sensor x. According to various examples, a coherence of 1 indicates that the chassis motion or suspension motion drove the vibration of sensor y. Additionally, in some examples, a coherence of 1 allows for filtering of the spectrum for chassis driven responses and/or identification of persistent new nonlinearities.

In various examples, the transducers 204 are permanently installed on the vehicle, and typical transducer responses, including a spectrum of the response of each transducer, is recorded and saved. Furthermore, relationships between the transducers are recorded. In some examples, a transfer function is used to characterize a relationship between certain elements. Using this information, typical responses of a vehicle with a healthy structure are measured and modeled, and a characterization of a healthy profile is generated. Thus, when measurements deviate from typical or expected responses, the deviations are flagged, and the vehicle is routed to a service center for inspection and repair.

Example Vehicle Front with Transducers

Figure 3:
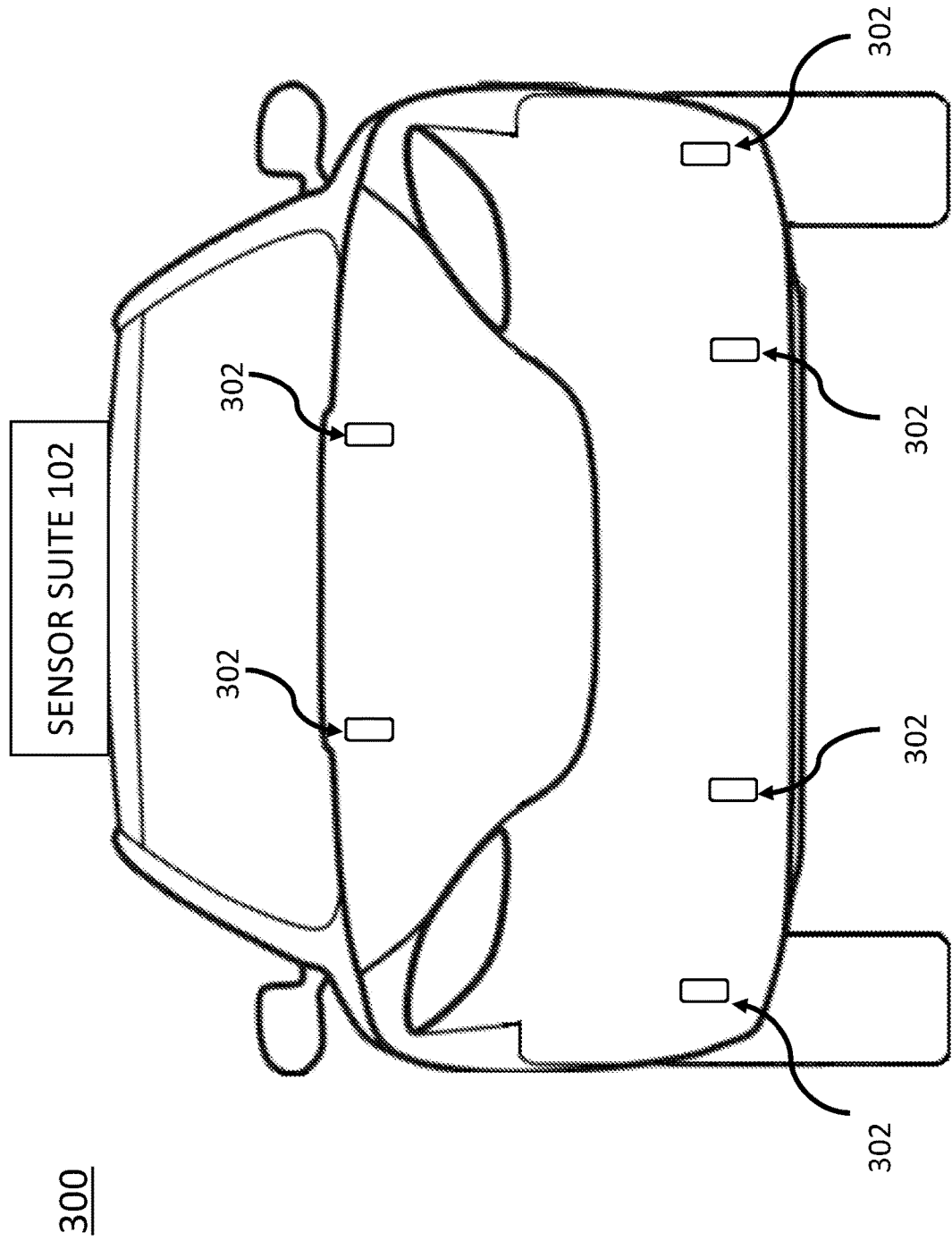
FIG. 3 is a diagram illustrating an example of a front of an autonomous vehicle with multiple transducers, according to some embodiments of the disclosure.

FIG. 3 is a diagram illustrating an example of a front of an autonomous vehicle 300 with multiple transducers 302, according to various embodiments of the invention. The transducers 302 are positioned underneath the fascia of the vehicle, such that they are not visible from the exterior. In various implementations, more or fewer transducers 302 are included on the vehicle 300, and in various implementations, the transducers 302 are located in any selected position on or in the vehicle 300. The transducers 302 measure structural integrity of the frame and other structural elements of the autonomous vehicle 300, as described above. As described above with respect to the transducers 204 of FIG. 2, in various examples, one or more of the transducers 302 are piezoelectric transducers, multi-axis piezoelectric transducers, accelerometers, multi-axis accelerometers, microphones, and piezoelectret sensors.

In various implementations, additional transducers 302 are positioned along the sides of an autonomous vehicle, and at the rear of the autonomous vehicle. These transducers may also be positioned underneath the fascia of the vehicle.

Responses among the various transducers 302 are used to determine typical pattern of structural health and to detect deviations from typical patterns. Additionally, the data from the transducers 302 can be combined with data from the transducers 204 of FIG. 2 as well as with data from transducers on the sides, rear, interior, frame, and other locations on the vehicle, to generate response patterns and detect anomalies.

Example System for Structural Health Monitoring

Figure 4:
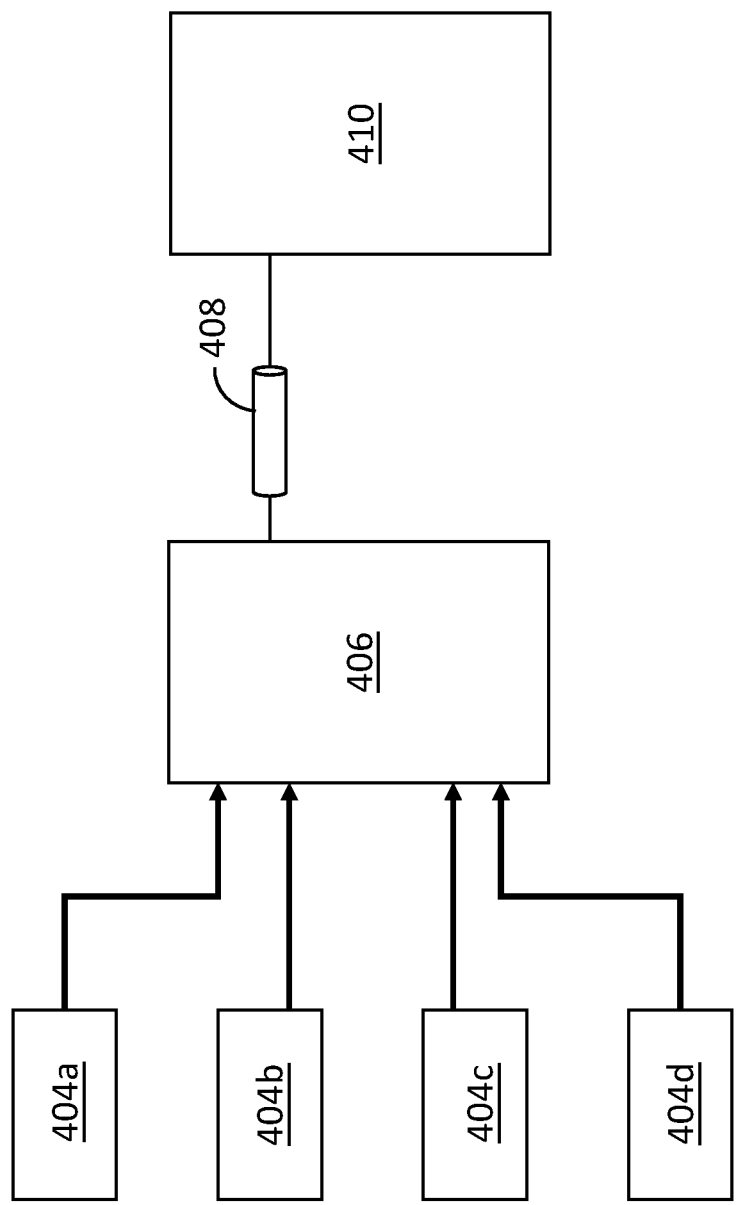
FIG. 4 is a diagram illustrating a system for structural integrity health monitoring, including multiple transducers, a data acquisition module, and a processing module, according to some embodiments of the disclosure.

FIG. 4 is a diagram 400 of a system for structural integrity monitoring, including multiple transducers 404a-404d, a data acquisition module 406, and a processing module 410, according to various embodiments of the disclosure. The transducers 404a-404d generate transducer data as described above with respect to FIG. 2. Each of the transducers 404a-404d are connected on a bus, and transducer data is transmitted to a data acquisition module 406. In various implementations, a bus includes more than four transducers. The transducer data is received as analog data, and in some examples, the analog transducer data is converted to a digital signal at an analog-to-digital converter on the bus. A transceiver transmits the data from the bus to the data acquisition module.

The transducer 404a-404d data is received at the data acquisition module 406, which collects the data from multiple transducers 404a-404d, and from multiple busses. In some examples, the data acquisition module 406 filters the transducer data. In some examples, the data acquisition module performs pre-processing filtering on the transducer data. In one example, the data acquisition module 406 is a FPGA-based (field programmable gate array-based) module and includes one or more filters for filtering the received transducer data. In another example, the data acquisition module 406 is DSP based, CPU based, or eFPGA based.

The data acquisition module 406 is connected to a processor 410 via a connection 408. In some examples, the connection 408 is one of an ethernet connection, an optical cable connection, and a wireless connection. The processor 410 receives the filtered transducer data from the data acquisition module 406 performs signal processing on the filtered data. In some examples, the processor 410 performs digital signal processing on the filtered data. The processor 410 detects outliers in the filtered data that may indicate a structural integrity variation.

In some examples, the transducer data includes a spectrum of data that can be divided into multiple bands, and a transfer function can be used to evaluate each of the bands. In one example, the spectrum is divided into twelve octave bands, and a twelve octave band transfer function is used to evaluate the transducer data and evaluate structural integrity.

In some examples, vibration spectra of individual transducers are monitored for changes in stiffness. In various examples, changes in stiffness are indicated by the movement of peaks in the spectra. In some examples, transfer functions between transducers are monitored for changes in stiffness. In various examples, changes in stiffness are indicated by the movement of peaks in the transfer function.

In some examples, relative displacement between accelerometers is used to characterize large scale deformation of a portion of the vehicle. Additionally, in some examples, relative displacement between accelerometers is used to detect change in the deformation due to suspension and/or chassis inputs.

In some examples, coherence equations are used to split the transducer data spectrum into categories. In particular, coherence equations can be used to split the transducer data spectrum into a portion that includes chassis-driven data and a portion that includes wind or other noise-driven data.

Example Method for Structural Health Monitoring

Figure 5:
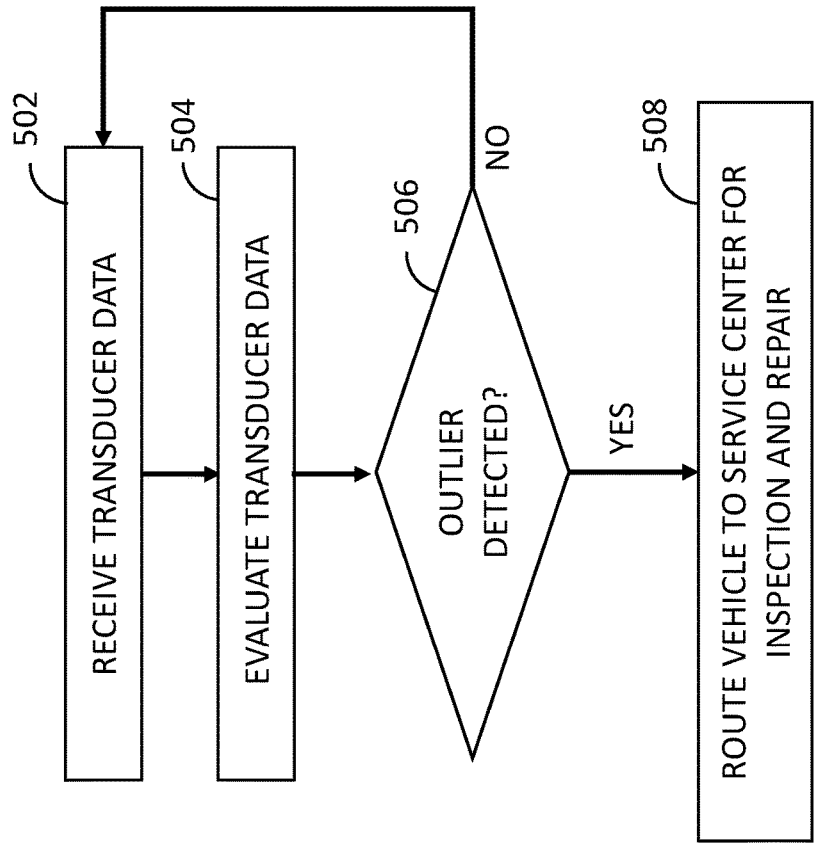
FIG. 5 is a flow chart illustrating a method for monitoring the structural health of a vehicle, according to some embodiments of the invention.

FIG. 5 shows a method 500 for monitoring the structural health of a vehicle, according to various embodiments of the disclosure. At step 502, transducer data is received at a bus. The transducer data can be digital or analog data, and analog transducer data is converted to a digital signal at an analog-to-digital converter (ADC). The ADC for converting analog data can be positioned prior to the bus or on the bus. A transceiver can be used to transmit the transducer data to a data acquisition module. In various examples, the data acquisition module receives data from multiple transducers. The data acquisition module combines the transducer data from multiple transducers and, in some examples, performs filtering functions on the transducer data. In some examples, the data acquisition module pre-processes the transducer data.

The data acquisition module transmits the transducer data to a computing system, such as the onboard computer 104 in the autonomous vehicle of FIG. 1. The computing system includes a signal processing module, and, as step 504, the signal processing module processes the transducer data. In some examples, the signal processing module filters out noise, such as wind noise and road noise. The signal processing module also receives odometer data from a main inertial sensor which can contribute to information about expected wind noise.

At step 506, the signal processing module determines if the transducer data includes any outliers. In some examples, the new transducer data is compared to typical transducer data to detect outliers. In some examples, the new transducer data is compared to previous transducer data to detect outliers. In some examples, if an outlier in the transducer data is identified, the signal processor repeats the evaluation with a next set of transducer data to confirm that the outlier is consistent, and not a temporary aberration. If no outliers are detected at step 506, the method returns to step 502. In some examples, the transducers are permanently installed in the vehicle, and transducer data is regularly evaluated. In some implementations, transducer data is collected to identify transducer data patterns. In some implementations, transducer data from multiple vehicles is collected to identify classes of expected failures.

If, at step 506, an outlier is detected, the onboard computer flags the outlier for review. In some examples, the onboard computer sends outlier data to a central computing system. In some examples, logged data is compared to a larger off-board data set at regular intervals. According to various implementations, the onboard computer and/or the central computing system may perform additional steps to ensure validity of the detected outlier. At step 508, the vehicle is routed to a service center for inspection and repair.

Example of Autonomous Vehicle Fleet

Figure 6:
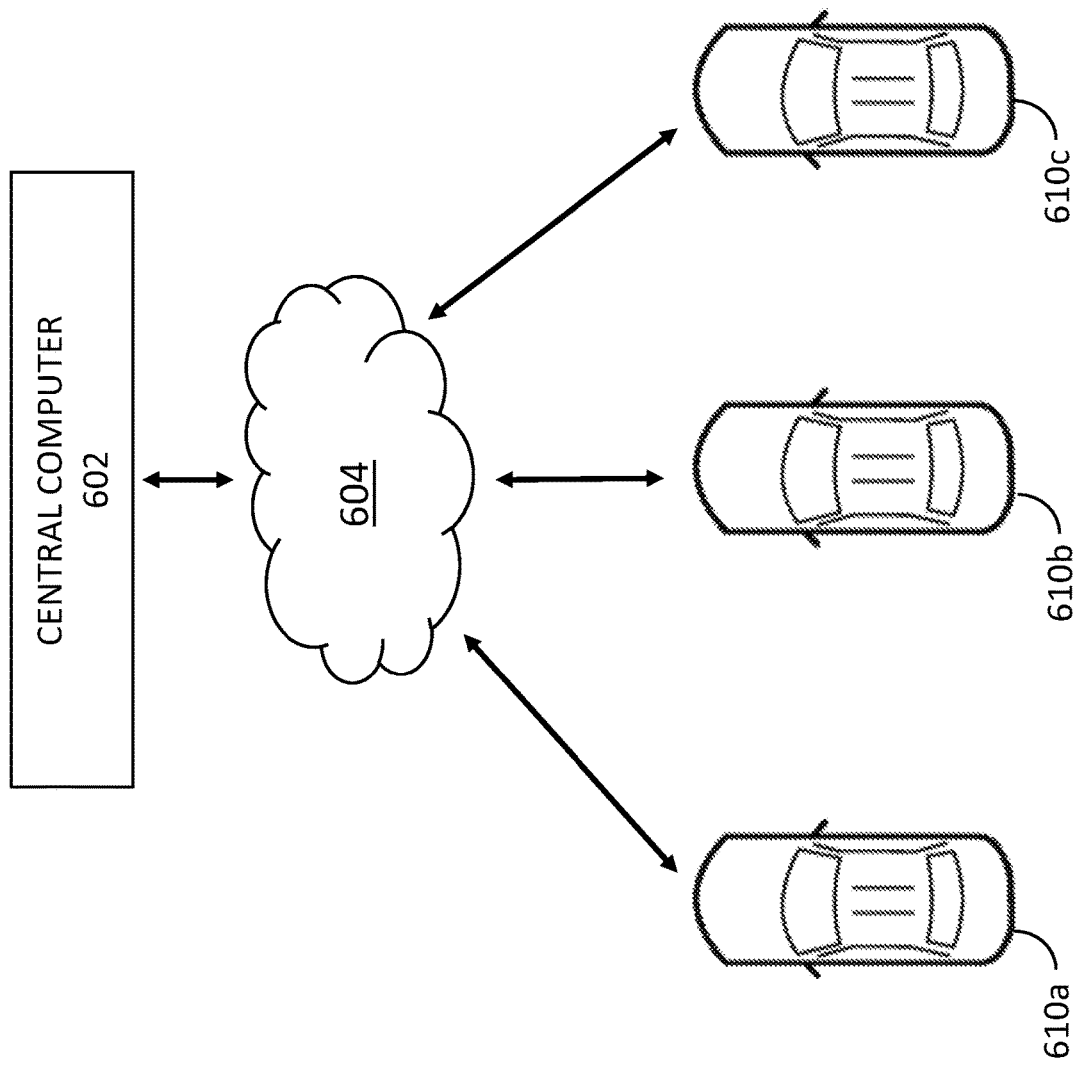
FIG. 6 is a diagram illustrating a fleet of autonomous vehicles in communication with a central computer, according to some embodiments of the invention.

FIG. 6 is a diagram illustrating a fleet of autonomous vehicles 610a-610c in communication with a central computer 602, according to some embodiments of the disclosure. As shown in FIG. 6, the vehicles 610a-610c communicate wirelessly with a cloud 604 and a central computer 602. The central computer 602 includes a routing coordinator and a database of information from the vehicles 610a-610c in the fleet. Autonomous vehicle fleet routing refers to the routing of multiple vehicles in a fleet. In some implementations, autonomous vehicles communicate directly with each other. The vehicles 610a-610c include structural integrity monitoring systems. In various examples, when the structural integrity monitoring systems in one or more of the vehicles 610a-610c flags an outlier, the information is communicated with the central computer 602.

When a ride request is received from a passenger, the routing coordinator selects an autonomous vehicle 610a-610c to fulfill the ride request, and generates a route for the autonomous vehicle 610a-610c. The generated route includes a route from the autonomous vehicle's present location to the pick-up location, and a route from the pick-up location to the final destination.

Each vehicle 610a-610c in the fleet of vehicles communicates with a routing coordinator. In some examples, the vehicles 610a-610c send information to the routing coordinator such structural health data. In various examples, structural integrity data indicates outlier measurements or potential structural integrity problems, the routing coordinator directs the autonomous vehicle to return to a service center for inspection and/or repair.

Additionally, information gathered by various autonomous vehicles 610a-610c in the fleet can be communicated with the routing coordinator, where it is saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more travelling preferences and/or routing goals. Data can also be used to avoid various road hazards, such as pot holes and speed bumps.

According to various implementations, a set of parameters can be established that determine which metrics are considered (and to what extent) in determining routes or route modifications. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints. In another example, a routing goal includes minimizing power expenditure and conserving charge on the HV battery of the vehicle.

Routing goals may be specific or general in terms of both the vehicles they are applied to and over what timeframe they are applied. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals include goals involving trip duration (either per trip, or average trip duration across some set of vehicles and/or times), physics, laws, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridesharing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, passenger safety, pedestrian safety, toll cost, etc. In examples where vehicle demand is important, routing goals may include attempting to address or meet vehicle demand.

Routing goals may be combined in any manner to form composite routing goals; for example, a composite routing goal may attempt to optimize a performance metric that takes as input trip duration, rideshare revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals take priority. Routing goals and routing goal priorities may be set by any suitable source (e.g., an autonomous vehicle routing platform, an autonomous vehicle passenger).

The routing coordinator uses maps to select an autonomous vehicle from the fleet to fulfill a ride request. In some implementations, the routing coordinator sends the selected autonomous vehicle the ride request details, including pick-up location and destination location, and an onboard computer on the selected autonomous vehicle generates a route and navigates to the destination and/or any intermediate stop. Similarly, in some examples, during an intermediate stop, the onboard computer determines whether the autonomous vehicle parks or continues to drive and circles back to the pick-up location. In some implementations, the routing coordinator in the central computing system 602 generates a route for each selected autonomous vehicle 610a-610c, and the routing coordinator determines a route for the autonomous vehicle 610a-610c to travel from the autonomous vehicle's current location to a first intermediate stop.

In some implementations, each vehicle 610a-610c provides an indication of the state of charge of the vehicle's battery to the central computing system 602. The central computing system 602 may include one or more battery data databases to store state of charge for each vehicle 610a-610c. The battery data databases may be communicatively coupled to the central computing system 602 and the battery data databases may be stored on one or more servers and/or other memory devices. The battery data databases may store data related to charging and/or discharging of batteries, such as charging curves of the batteries and/or discharging curves of the batteries.

In various implementations, the central computing system 602 determines power requirements for various routes, and state of charge of the battery in each vehicle 610a-610c is considered in selecting a vehicle to fulfill a route request. Furthermore, the central computing system 602 can predict when a vehicle 610a-610c state of charge will reach a low level, and determine when the vehicle 610a-610c will be routed to a charging center.

The central computing system 602 and routing coordinator may further include data regarding battery maintenance activities during routing assignments. The data regarding battery maintenance activities may include allowable charging frequency for the routing assignments (i.e., how often a battery may be charged during the assignments, which may be indicated as the minimum amount of time between which a vehicle can return to a charging station for charging of the battery), allowable charge-times (i.e., the maximum amount of time that a vehicle can remain at a charging station for a charge cycle of the battery before returning to routing assignments), amount of time the vehicle is to be on the road during the routing assignments, rates of charging available, or some combination thereof. The data regarding battery maintenance activity may be utilized by the central computing system 602 to determine manage battery levels of the fleet of vehicles.

In some implementations, the central computing system 602 stores additional battery-related information for each vehicle in the battery databases. For example, the battery databases may include data regarding, battery age for batteries in each of the vehicles, cost of battery replacement for each of the batteries, effects on hardware of each of the vehicles, hardware arrangements of the vehicles (such as sensors of the vehicles, control systems of the vehicles, and/or software implemented on the vehicles), or some combination thereof. The central computing system 602 may utilize the vehicle-specific information to determine vehicle-specific current draw from the battery and/or the cost of replacing the battery.

The central computing system 602 battery database may further include data related to environmental factors for the routing assignments, since environmental factors can affect power usage. The data related to the environmental factors may include environmental data (such as temperature, wind, and/or rain) and route data (such as grades of the terrain) for the routing assignments. In some embodiments, the battery databases may further include data indicating the effects of the environmental factors on current draw and/or charging due to regenerative braking for the routing assignments. The central computing system 602 utilizes the data related to the environmental factors to compensate for changes in the amount of charge used for the routing assignments and/or the current draw on the batteries of the vehicles when assigned to the routing assignments.

In some implementations, the central computing system 602 receives indications of battery states for the batteries of the vehicles in the fleet. The central computing system 602 can generate or update one or more state-of-charge profiles for each of the batteries based on a determined degradation level and the data from the battery databases. Each state-of-charge profile of the state-of-charge profiles may include an upper bound value that indicates a maximum optimal charge for the battery and a lower bound value that indicates a minimum optimal charge for the battery. Each state of charge profile also includes a low threshold state of charge for triggering an automatic shut down event.

In some implementations, the central computing system 602 flags structural health issue for a vehicle and sends instructions to the vehicle to drive to a service center, as described with respect to FIG. 5.

In some implementations, the central computing system 602 determines characteristics for the routing assignments. For example, the characteristics may include the predicted amounts of energy for the routing assignments, the anticipated charging frequency for each vehicle, the charge-times for each vehicle, the amount of time each vehicle will be on the road, and/or the rate of charging available. Based on the characteristics, the central computing system 602 selects vehicles from the available vehicles that satisfy the characteristics of the routing assignments.

Example of a Computing System for Ride Requests

Figure 7:
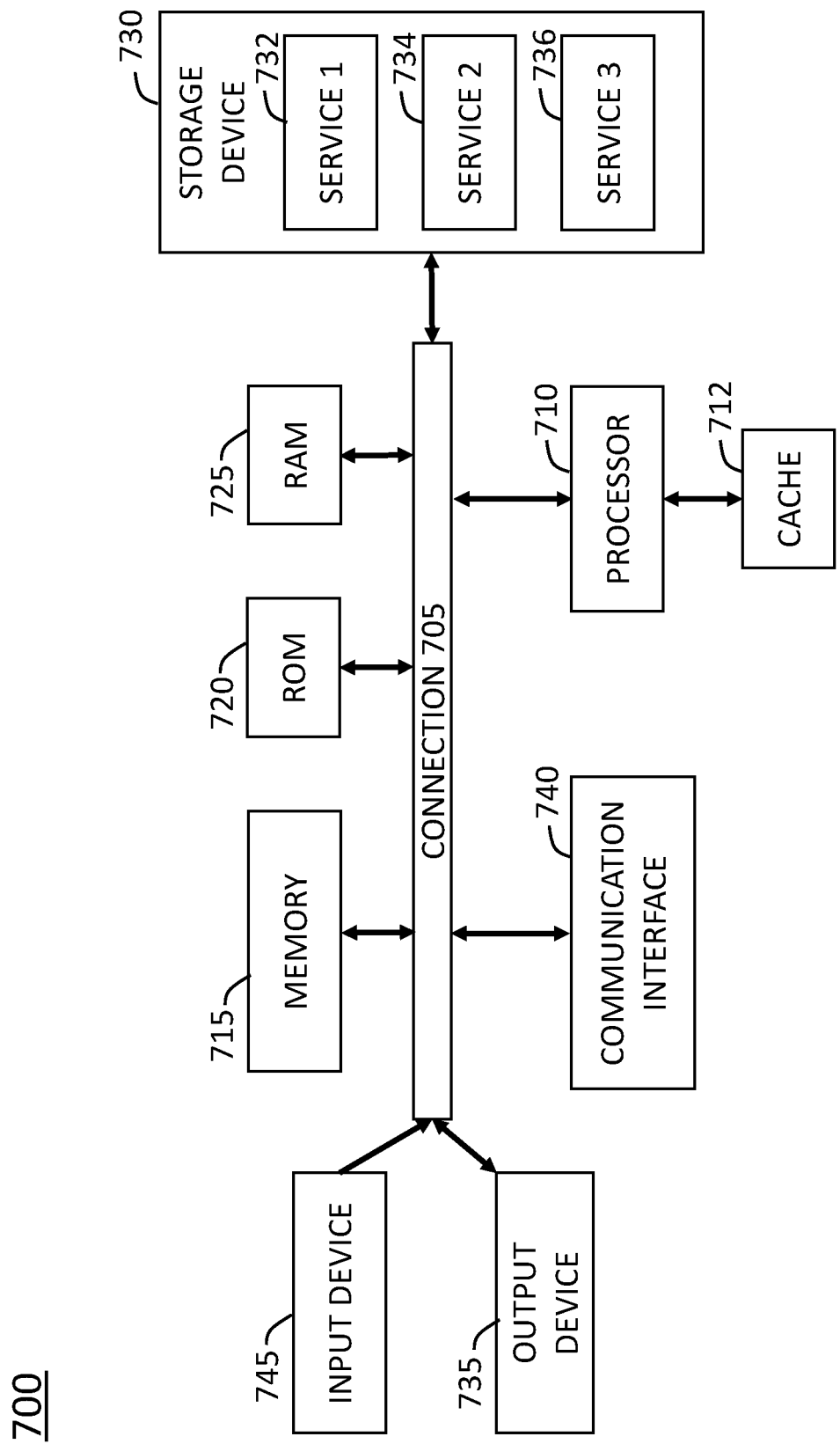
FIG. 7 shows an example embodiment of a system for implementing certain aspects of the present technology.

FIG. 7 shows an example embodiment of a computing system 700 for implementing certain aspects of the present technology. In various examples, the computing system 700 can be any computing device making up the onboard computer 104, the central computing system 602, or any other computing system described herein. The computing system 700 can include any component of a computing system described herein which the components of the system are in communication with each other using connection 705. The connection 705 can be a physical connection via a bus, or a direct connection into processor 710, such as in a chipset architecture. The connection 705 can also be a virtual connection, networked connection, or logical connection.

In some implementations, the computing system 700 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 700 includes at least one processing unit (CPU or processor) 710 and a connection 705 that couples various system components including system memory 715, such as read-only memory (ROM) 720 and random access memory (RAM) 725 to processor 710. The computing system 700 can include a cache of high-speed memory 712 connected directly with, in close proximity to, or integrated as part of the processor 710.

The processor 710 can include any general-purpose processor and a hardware service or software service, such as services 732, 734, and 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction, the computing system 700 includes an input device 745, which can represent any number of input mechanisms, such as a microphone for speech, a touch-sensitive screen for gesture or graphical input, keyboard, mouse, motion input, speech, etc. The computing system 700 can also include an output device 735, which can be one or more of a number of output mechanisms known to those of skill in the art. In some instances, multimodal systems can enable a user to provide multiple types of input/output to communicate with the computing system 700. The computing system 700 can include a communications interface 740, which can generally govern and manage the user input and system output. There is no restriction on operating on any particular hardware arrangement, and therefore the basic features here may easily be substituted for improved hardware or firmware arrangements as they are developed.

A storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as a processor 710, a connection 705, an output device 735, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Select Examples

Example 1 provides a system for monitoring structural integrity of a vehicle, comprising: a plurality of transducers positioned in the vehicle configured to generate transducer data; a data acquisition module configured to receive the transducer data and generating combined transducer data; and a processor configured to process the combined transducer data and identify outlier data.

Example 2 provides a system according to one or more of the preceding and/or following examples, wherein the processor is further configured to transmit a notification of the outlier data to a central computing system.

Example 3 provides a system according to one or more of the preceding and/or following examples, wherein the outlier data indicates a change in the structural integrity of the vehicle.

Example 4 provides a system according to one or more of the preceding and/or following examples, wherein at least one of the plurality of transducers is a piezoelectric transducer.

Example 5 provides a system according to one or more of the preceding and/or following examples, wherein at least one of the plurality of transducers is positioned at an interconnect between a vehicle frame and a vehicle fascia, and wherein the at least one transducer captures interconnect data.

Example 6 provides a system according to one or more of the preceding and/or following examples, wherein the plurality of transducers is configured to continuously generate transducer data.

Example 7 provides a system according to one or more of the preceding and/or following examples, further comprising a shaker module positioned in the vehicle, wherein the shaker module is configured to generate a soundwave.

Example 8 provides a system according to one or more of the preceding and/or following examples, wherein the plurality of transducers is configured generate the transducer data in response to the soundwave.

Example 9 provides a method for monitoring structural integrity of a vehicle, comprising: receiving transducer data from a plurality of transducers on a vehicle frame; filtering the transducer data to reduce noise; evaluating the transducer data to identify data patterns; and determining a level of structural integrity of the vehicle based on the transducer data.

Example 10 provides a method according to one or more of the preceding and/or following examples, further comprising detecting an outlier in the data patterns.

Example 11 provides a method according to one or more of the preceding and/or following examples, further comprising further comprising routing the vehicle to a service center for inspection.

Example 12 provides a method according to one or more of the preceding and/or following examples, further comprising transmitting a notification of the detected outlier to a central computing system.

Example 13 provides a method according to one or more of the preceding and/or following examples, wherein detecting an outlier in the data comprises detecting a change in the structural integrity of the vehicle.

Example 14 provides a method according to one or more of the preceding and/or following examples, further comprising comparing the transducer data to identified classes of expected failures.

Example 15 provides a method according to one or more of the preceding and/or following examples, further comprising generating a soundwave using a shaker module positioned in the vehicle.

Example 16 provides a method according to one or more of the preceding and/or following examples, wherein receiving transducer data includes receiving transducer data generated in response to the soundwave.

Example 17 provides a system for monitoring structural integrity of a fleet of vehicles, comprising: an onboard computing system on a first autonomous vehicle of the fleet configured to: receive the transducer data from a plurality of transducers on the first autonomous vehicle; and determine a level of structural integrity of the vehicle based on the transducer data; and a central computing system including a routing coordinator configured to: receive first autonomous vehicle data including the level of structural integrity.

Example 18 provides a system according to one or more of the preceding and/or following examples, wherein the central computing system is further configured to: identify data patterns from structural integrity data from a plurality of vehicles in the fleet; and detect selected data patterns associated with structural integrity failures.

Example 19 provides a system according to one or more of the preceding and/or following examples, wherein the central computing system is further configured to detect an outlier in the first autonomous vehicle data, and route the first autonomous vehicle to a service center for inspection.

Example 20 provides a system according to one or more of the preceding and/or following examples, wherein the onboard computing system is further configured to evaluate the transducer data to identify data patterns, and detect an outlier in the data patterns.

Variations and Implementations

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A system for monitoring structural integrity of a vehicle, comprising:
   a plurality of piezoelectric transducers positioned in the vehicle configured to generate transducer data, wherein at least one of the plurality of transducers is positioned at an interconnect between a vehicle frame and a vehicle fascia, and wherein the at least one transducer captures interconnect data indicating strain at the interconnect;
   a data acquisition module configured to receive the transducer data and generate combined transducer data; and
   a processor configured to:
      process the combined transducer data;
      identify outlier data, wherein the outlier data indicates a change in the structural integrity of the vehicle; and
      detect a vehicle structural issue based on the outlier data.

2. The system of claim 1, wherein the processor is further configured to transmit a notification of the outlier data to a central computing system.

3. The system of claim 1 wherein the plurality of transducers is configured to continuously generate transducer data.

4. The system of claim 1, further comprising a shaker module positioned in the vehicle, wherein the shaker module is configured to generate a soundwave, wherein the soundwave is an ultrasonic frequency.

5. The system of claim 4, wherein the plurality of piezoelectric transducers is configured generate the transducer data in response to the soundwave.

6. The system of claim 1, wherein the processor is further configured to categorize detected structural issues as one of normal aging, structural failure, and mechanical failure.

7. The system of claim 6, wherein detecting structural issues includes detecting vehicle damage caused by fatigue.

8. The system of claim 1, wherein the processor is further configured to utilize tomography to generate an expected structural profile based on the combined transducer data and to detect deviations from the expected structural profiles.

9. The system of claim 1, wherein the plurality of piezoelectric transducers each produce an electric voltage, wherein the transducer data includes respective electric voltage measurements, and wherein the processor is further configured to:
- determine a respective stress value for each of the plurality of piezoelectric transducers, and
- detect the vehicle structural issue based, in part, on the respective stress values.

10. A method for monitoring structural integrity of a vehicle, comprising:
- receiving transducer data from a plurality of piezoelectric transducers on a vehicle frame, wherein at least one of the plurality of transducers is positioned at an interconnect between a vehicle frame and a vehicle fascia, and wherein receiving the transducer data includes receiving interconnect data indicating strain at the interconnect from the at least one transducer;
- filtering the transducer data to reduce noise;
- evaluating the transducer data to identify data patterns;
- determining a level of structural integrity of the vehicle based on the transducer data;
- detecting an outlier in the data patterns; and
- identifying at least one vehicle structural issue based on the outlier and the data patterns.

11. The method of claim 10, further comprising routing the vehicle to a service center for inspection.

12. The method of claim 10, further comprising transmitting a notification of the detected outlier to a central computing system.

13. The method of claim 10, further comprising comparing the transducer data to identified classes of expected failures, and categorizing the at least one vehicle structural issue as one of normal aging, structural failure, and mechanical failure.

14. The method of claim 10, further comprising generating a soundwave using a shaker module positioned in the vehicle, wherein the soundwave is an ultrasonic frequency.

15. The method of claim 14, wherein receiving transducer data includes receiving transducer data generated in response to the soundwave.

16. The method of claim 10, further comprising utilizing tomography to generate an expected structural profile based on the combined transducer data, and detecting deviations from the expected structural profiles.

17. The method of claim 10, further comprising determining a source of vibration based on the transducer data, including using coherence to identify chassis motion causing the vibrations.

18. A system for monitoring structural integrity of a fleet of vehicles, comprising:
- an onboard computing system on a first autonomous vehicle of the fleet configured to:
  - receive the transducer data from a plurality of transducers on the first autonomous vehicle, wherein at least one of the plurality of transducers is positioned at an interconnect between a vehicle frame and a vehicle fascia, and wherein the at least one transducer captures interconnect data indicating strain at the interconnect; and
  - determine a level of structural integrity of the vehicle based on the transducer data;
  - evaluate the transducer data to identify first vehicle data patterns;
  - detect an outlier in the first vehicle data patterns; and
  - identify at least one vehicle structural issue based on the outlier and the first vehicle data patterns; and
- a central computing system including a routing coordinator configured to:
  - receive first autonomous vehicle data including the level of structural integrity.

19. The system of claim 18, wherein the central computing system is further configured to:
- identify data patterns from structural integrity data from a plurality of vehicles in the fleet; and
- detect selected data patterns associated with structural integrity failures.

20. The system of claim 18, wherein the onboard computing system further configured to determine a respective strain value for each of the plurality of transducers, wherein the respective strain value is proportional to deformation of the respective transducer.

* * * * *